United States Patent [19]

Chu et al.

[11] 3,761,638

[45] Sept. 25, 1973

[54] PROCESS AND DEVICE FOR IDENTIFYING CONNECTIONS IN A SWITCHING NETWORK

[75] Inventors: Pe Tsi Chu; Bernard Corby; Andre Ernest James; Robert Leblanc, all of Vence; Andrzej Tadeusz Milewski, Lagaude, all of France

[73] Assignee: International Business Machines Corporation, New York, N.Y.

[22] Filed: Dec. 30, 1971

[21] Appl. No.: 214,049

[30] Foreign Application Priority Data

Dec. 30, 1970 France .............................. 7047685

[52] U.S. Cl. ............................................ 179/18 FG
[51] Int. Cl. ............................................ H04m 3/24
[58] Field of Search ................... 179/18 GF, 18 FH, 179/18 ES, 18 FG, 18 FF, 18 AB, 18 EA; 340/172.5

[56] References Cited

UNITED STATES PATENTS 3,627,953 12/1971 Houcke et al. ................. 179/18 FG

*Primary Examiner*—Kathleen H. Claffy
*Assistant Examiner*—Kenneth D. Baugh
*Attorney*—Frederick D. Poag et al.

[57] ABSTRACT

A process and apparatus for identifying connections between input lines and output lines in a switching network having current sources associated with each output line to feed a connection path between an input line and an output line. The output lines are scanned until one is found ON, and then its current source is disconnected and the input lines are scanned to determine which has changed status. The results are recorded and the process is continued through the series of output lines.

8 Claims, 6 Drawing Figures

PROCESS AND DEVICE FOR IDENTIFYING CONNECTIONS IN A SWITCHING NETWORK

This invention concerns a process and device for identifying connections in a switching network and, more particularly, in a telephone switching network with centralized control.

It is a well-known fact that the modern telephone exchanges have more and more been controlled by computers which, in a centralized manner, carry out all of the tests for a change of status and, with respect to the results from these tests, elaborate orders for the connection or disconnection of the appropriate circuits.

It is also well known that a telephone exchange, whether it be public or private, must operate without any interruption and failure and that a break-down putting it totally out of service during several hours, is not permissible. In order to obtain the required fiability, a second computer is generally provided for, which, in the case of a failure from the former, can be put in service automatically, and ensures the correct operation of the exchange while the former is being repaired.

When the second computer assumes the operation in its turn, a number of connections generally exist in the switching network which had been established by the first computer before its failure, for example, connections establishing a call between two subscribers. It is obvious that the second computer must know the identity of each of the elements having a part in these connections, in order to be able to carry on with their operation: for instance, as soon as a subscriber has replaced his handset, the path which connected said subscriber to the other one through the switching network, has to be disconnected and to this end, the identity of the involved crosspoint switches and junctor, has to be known.

Various solutions have been proposed to solve this problem. The most common way consists in providing for a permanent connection between the main computer and the spare computer so that the latter has all the data stored by the former, memorized at any instant, the up-dating being carried out automatically. This solution is relatively simple but has a few drawbacks.

One object of this invention is to provide for a switching system comprising a first computer which controls normally the operation of the system, and a second computer which is operated as soon as the first one is put out of service, and which overcomes said drawbacks.

Another object of this invention is to make it possible to put the second computer in service at any instant without its having to update its memory as to the status of the existing connections in the switching network.

Another object of this invention is to provide for a process wherein the second computer can find out, itself, the existing connections by proceeding to a series of appropriate tests as soon as it is put in service.

Still another object of this invention is that the second computer can be put in service as soon as the first one is out of service without interfering with the calls established before the transfer operation.

These objects and advantages, and others, which will become apparent from the following description and with the help of the accompanying drawings, are reached in a particular embodiment of this invention which is summaried hereinafter.

In conformity with this particular embodiment, the telephone switching system includes at least one switching network formed of a plurality of cascade-mounted switching matrix stages, wherein there exists only one possible path between a determined input and a determined output in the network, for instance, between a subscriber's extension line input (or a trunk line input) and a determined terminal of a junctor. In such a network, the establishment of a D.C. path between an output and a junctor terminal, is made upon connection of a D.C. source, the so-called feeder, to said junctor terminal, and closure of the crosspoint switches involved in this single path which makes it possible to connect this input to this feeder.

In such a switching network, if a feeder, which was operating, is disconnected, no current is flowing any longer in this path which the feeder was connected to. If a means is provided for scanning the status of the inputs, then, it can be detected that no current is flowing any longer into one of said inputs, which means that this input was connected to the considered feeder.

When generalizing this principle, it is possible to identify each of the D.C. paths existing in the network and, therefore, the voice paths.

The proceedure, then, is as follows:

a. all the inputs are scanned successively and their respective status are stored;

b. the junctor feeders are scanned successively until one is found operating;

c. the feeders are stopped being scanned; the address of the one which has been found operating is stored and the latter is disconnected;

d. the inputs are scanned and, for each of them, the present status is compared with the previously detected status.

e. as soon as an input is detected to have passed from the on to off status, the inputs are no more scanned and the address of this extension line is stored as corresponding to the feeder the address of which had just been stored;

f. the feeders are scanned anew from the one which immediately follows the feeder for which the scanning operation has been stopped, and steps c, d and e are resumed each time a feeder is found to be operating;

g. when the last feeder is reached:
   should it be operating, steps c, d and e are resumed and the procedure is stopped,
   should it be not operating, the procedure is stopped.

h. with the help of the stored addresses, all the paths which have been disconnected from the feeders, are re-established.

With reference to the accompanying FIGS. 1–6, a particular embodiment of the invention will now be described. The arrangements which are disclosed with respect to this particular embodiment are given by way of a non limitative example, only.

Figure 1:
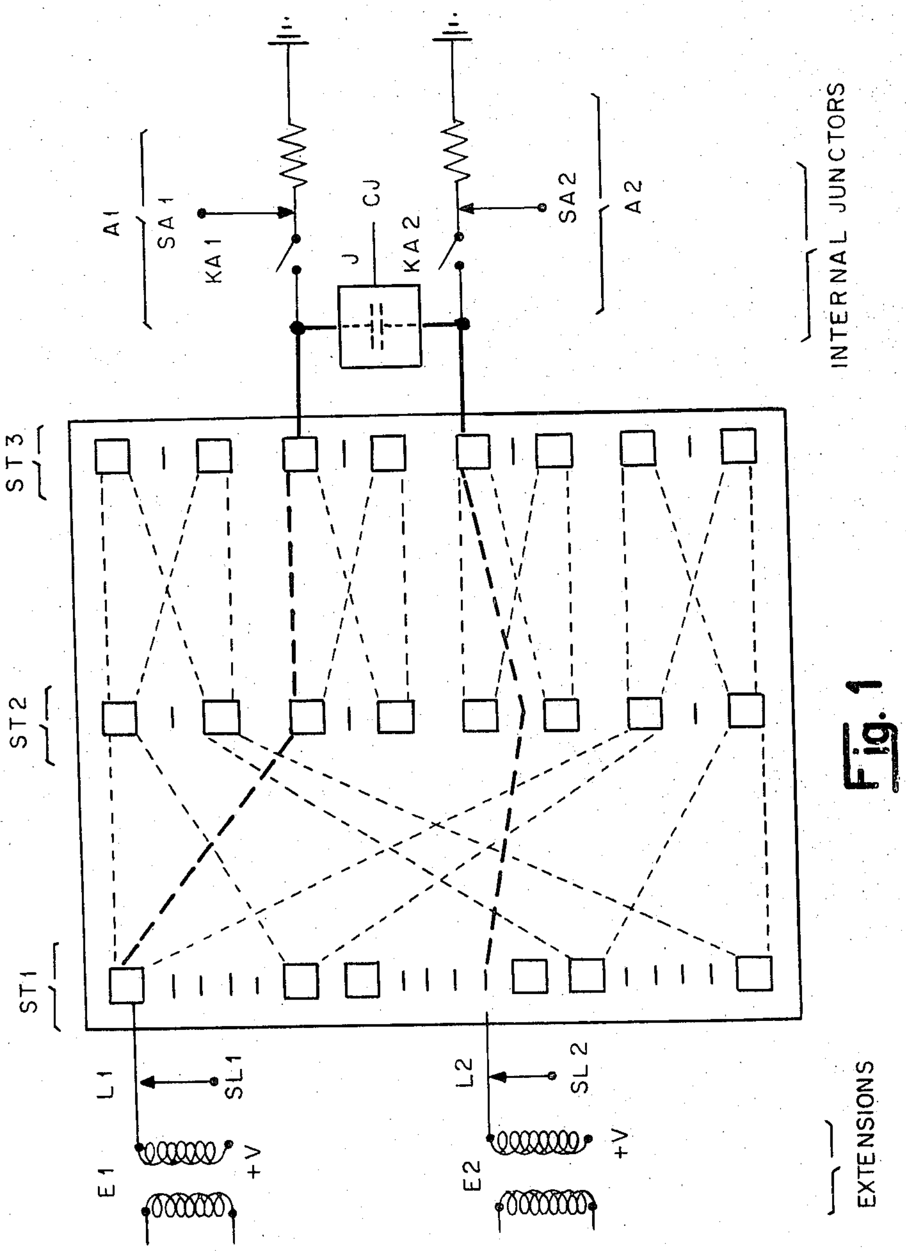
FIG. 1 is a schematic diagram of a switching network in conformity with this invention.

FIG. 1 is a representative of part of a switching network, for instance, a switching network belonging to a private telephone exchange with which it is possible to establish calls between two extension lines (which, hereinafter, are simply called extensions) such as E1 and E2. This part of the switching network that will be called network, in order to make the following description clearer, is essentially formed of three cascade-mounted switching matrices ST1, ST2, ST3. In the figure, in order to make it clearer, the switching matrices are represented by squares, and some of the connections between the different matrix stages have been represented by dotted lines. Such a network is of the type disclosed in French Pat. No. 1,500,785 filed on Jan. 4, 1966 by the applicant, i.e., in such a network, there exists only one possible path between an input placed on one side of the network and an output placed on the other side of such a network. In this example, the network inputs, on the left side of the figure, are connected to the various extensions of the private telephone exchange whereas the network outputs, on the right side of the figure, are connected two by two to units such as J which are sometimes called internal junctors for they are used to proceed to internal connections between extensions.

In such a network, the connection between a given extension E1 and another given extension E2 is made, for instance, by connecting, through the switching network, the two respective inputs corresponding to extensions E1 and E2, to the two terminals or junctor J. Such a connection is represented in the figure by a strong line the dotted strong line being representative of the portion of the path inside the switching network. Indeed, for some reasons which will become apparent in the following description, the establishment of the call between two extensions E1 and E2 is always preceded by the establishment of the two D.C. distinct paths.

The first path connects input line L1 corresponding to extension E1 to a circuit A1, the so-called feeder, and connected to one of the terminals of junctor J. Circuit A1, in fact, includes an element acting as a switch KA1 and a series-connected resistor between the junctor terminal and ground. When switch KA1 is closed and the appropriate crosspoint switches are controlled, it is obvious that a D.C. path is established between terminal +V of line L1 and the ground of feeder A1, through the switching network as shown by the strong dotted line.

Likewise, the second DC path connects input line L2 corresponding to extension E2 to a feeder circuit A2 which is connected between the second terminal of junctor J and ground, and, in a similar manner, includes a unit acting as a switch KA2 and a resistor. When switch KA2 is operated and the appropriate crosspoints have been controlled in the switching network, the second DC path is established between terminal +V of line L2 and the ground of feeder A2.

Once these two DC paths have been established, junctor J, then, is operated by a control circuit CJ so that a voice current connection is established between the two terminals of said junctor, and this, without any interaction between the DC paths which have just been disclosed.

In conformity with this invention, all the input lines such as L1 and L2 include an additional circuit schematically shown in SL1 and SL2, respectively which is used to test the ON or OFF status of these lines, under the control of a centralized control unit, such as a computer. Likewise, feeders such as A1 and A2 include also additional circuits such as those schematically shown in SA1 and SA2 which are used to test the ON or OFF status of the corresponding feeder circuit still under the control of the centralized control unit.

Figure 2:
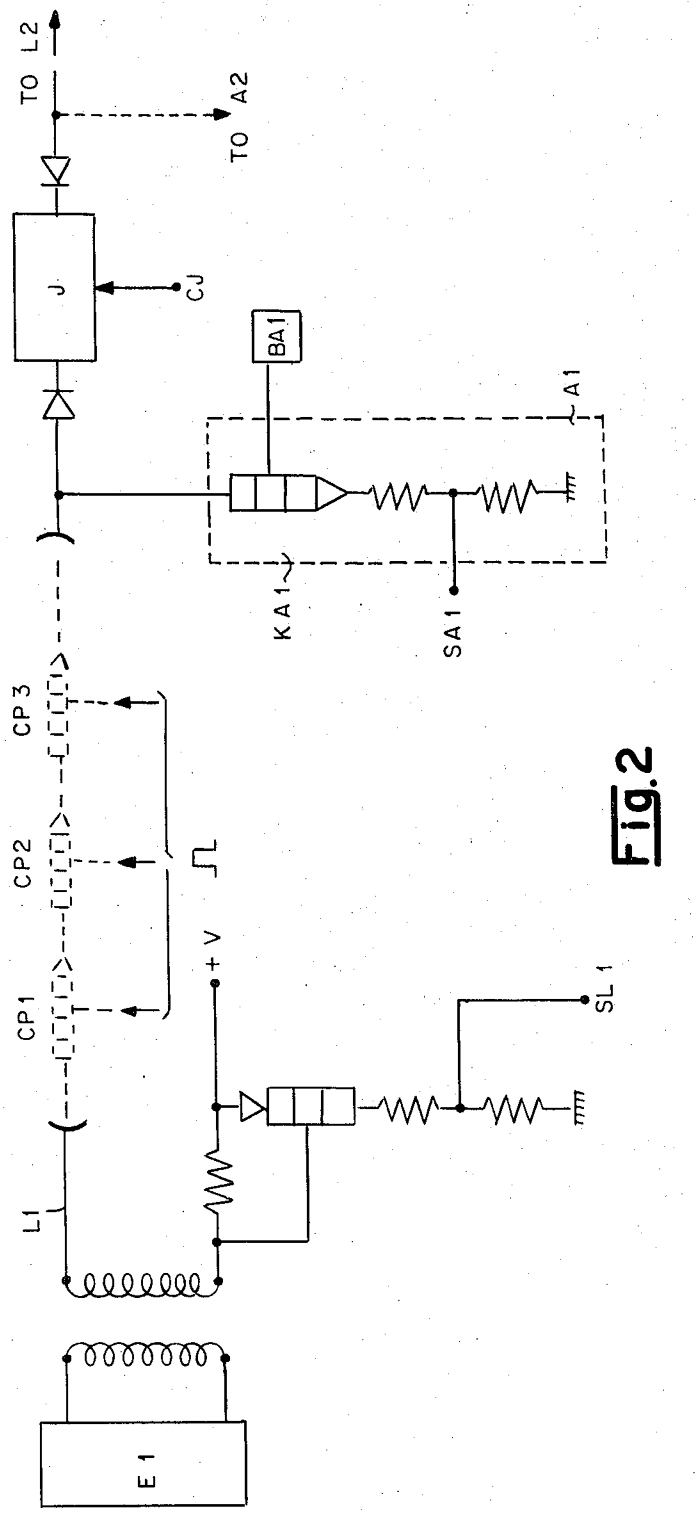
FIG. 2 is a schematic diagram of the D.C. current circuit which connects one input to one output of the network shown in FIG. 1.

FIG. 2 shows in more details the DC circuit connecting line L1 to junctor J. As shown in this figure, the crosspoint switches CP1, CP2 and CP3 are formed of controlled rectifiers, and switch KA1 of feeder A1 is formed of a NPN transistor the base of which is controlled by an appropriate circuit BA1. The DC path is established when controlling the base of transistor KA1 by an appropriate signal which causes said transistor to grow conducting, and by applying appropriate pulses to the control circuits of crosspoint switches CP1, CP2 and CP3. Such switches, then, are caused to be conducting and a DC current is established and flows between point +V of line L1 and the ground of feeder A1, as long as the base of transistor KA1 is being fed. The disconnection of the path requires only that the feeding of the base of transistor KA1 be interrupted by control circuit BA1. This figure shows also, and in more details, how the scanning circuit SA1 of feeder A1 as well as scanning circuit SL1 of input line L1, are branched.

With reference anew to FIG. 1, the elementary process which this invention is based upon, will now be disclosed.

In order to explain such a process, it will be supposed that the control unit normally in service, has failed, and at the instant when the spare control unit is put in service, extension E1 is connected to extension E2 through the switching network and junctor J, as shown in FIG. 1 by the strong solid line outside the network and by the strong dotted line inside the network. When this connection is carried out, it is obvious that feeder switches KA1 and KA2 are both closed. In order to make the description clearer, it will be said that said feeders are in their busy status.

When the spare computer is put in service, there is no information on the existing connections, and, therefore, it does not know that extensions E1 and E2 are connected to each other and neither does it know through which path they are connected. The process according to this invention is based on the following remark: If, at a determined instant, switch KA1 is opened, the DC path connecting terminal +V of line L1 to the ground of feeder A1, is disconnected. So, no DC current is flowing any more in this circuit and this lack of current can be detected at the level of line L1 by scanning circuit SL1. If, beforehand, all the input lines have been carefully tested such as L1 and L2, it can be observed, after the opening of switch KA1, that only one of these lines has changed from the busy status to the free, or idle, status which means that this line was connected to feeder A1. Since the switching network includes only one path between an input and an output as seen previously, the fact of knowing this input, namely line L1, and this output, namely the output corresponding to feeder A1, makes it possible to automatically identify the addresses of the crosspoints involved in this path.

Should this process be the same for each of the feeders in the busy status, it will therefore be easy to determine which extensions said feeders are connected to and, thereby, all the connections inside the switching network will be able to be identified. Of course, once the connections have been identified, the paths the addresses of which are now known, are re-established. When considering the rapidity with which a complete process can be carried out, it is obvious that the momentary disconnections in the voice circuits do not disturb the call in progress.

Figure 3:
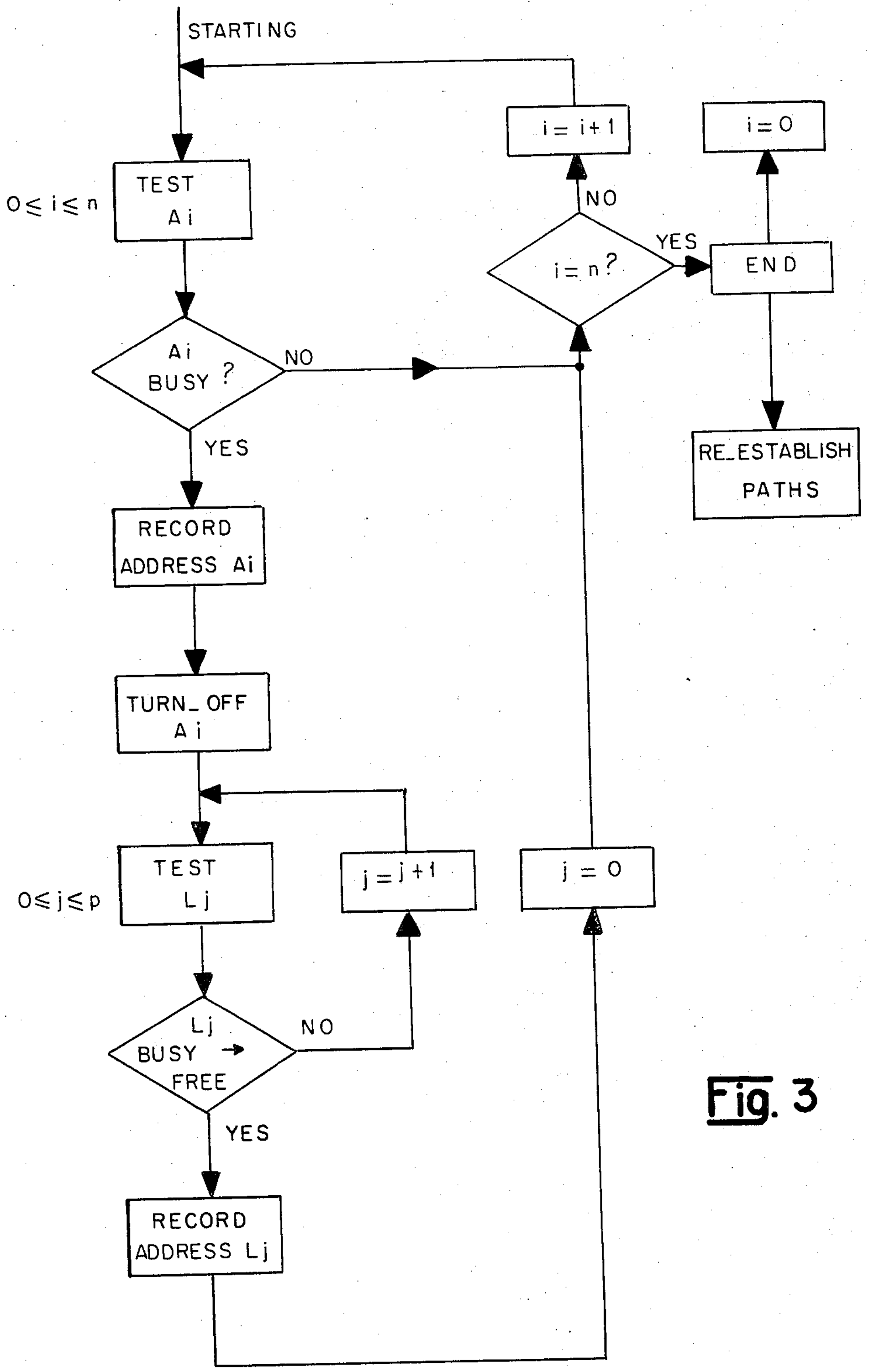
FIG. 3 is a flow diagram showing the different steps of the process according to the invention.

It will now be explained how a complete process is evolving, with which it is possible to identify all the connections existing in the network when the space computer is put in service. A flow diagram of such a process is shown in FIG. 3.

As soon as the spare computer is put in service, it proceeds to a complete scanning of each of the input lines in the network, L0, L1, L2 etc..., Lp and stores in an appropriate register the idle or busy status of these lines. Then, it starts with a sequential scanning procedure of feeders Ao, A1, A2,... until one feeder is found to be in the busy status, namely feeder Ai, by way of an example. From this very moment, the scanning procedure of the feeders is interrupted, and the address of the feeder which has just been found busy, is stored in a particular memory position. Then, the computer gives an order for disconnection of said feeder Ai, i.e., switch KAi is opened, and, right after, starts with a new sequential scanning procedure of the input lines.

For each scanning operation of the input lines, the status of the line is compared with the status in which this very line was during the scanning operation carried out at the beginning of the procedure. As soon as an input line is detected to have passed from the busy status to the idle status, namely Lj by way of an example, the sequential scanning procedure of the input lines is interrupted, and the address of this input line is stored in a memory position corresponding to that in which the address of the feeder which had just been found busy, was stored. Then, the memory contains, in two associated positions, the addresses Ai and Lj of an input line and a feeder which were connected to each other.

Then, the computer orders that the sequential scanning operation of the feeders be resumed, but from the address feeder A[*i*+1], only.

The process goes on as seen previously, i.e., for each feeder found busy, said feeder is disconnected, its address is memorized and a sequential scanning operation of the input lines is carried out until a line is found to have passed from the busy status to the idle status. This operation is carried out until the last feeder, namely An, is reached. When said last feeder is reached, two cases may occur: this feeder is either busy or idle.

Should it be busy, the process continues as seen previously until the corresponding input line is found out, a case wherein the process is over. Should it be idle, the process is immediately terminated.

At this moment, the memory contains two by two the addresses of the input lines and feeders which correspond thereto. There can be easily deduced the addresses of each of the switching network elements which intervene in the connection paths since there is only one possible path between so determined an input and a feeder. Then, the computer can re-establish all the paths that have been disconnected for the identification finding out purposes. Since this finding out is very rapid, the disconnections made in the voice paths have not adversely affected the calls in progress through these paths.

FIG. 3 is a flow diagram which illustrates the various steps and facilities which have just been explained. It should be noted that all the operations carried out during the connection identifying procedure are not disturbed by the operations which may be carried out in the same time by the users of the telephone exchange. Indeed, the only elements intervening for these identification operations are circuit elements which the users have not access to. These circuit elements, namely the feeders and the crosspoint switches mainly, can be controlled by the centralized control unit, only, and, consequently, there is no reason to have them operated without any order coming from this unit. Thus, the only changes in the status that intervene during the identification procedure can only be those due to the disconnection of a feeder, which has been ordered during an identification procedure with a view to identifying the corresponding input line.

It should also be noted that the changes in the status which intervene, say, at the level of the extension loop circuits, are not processed by the control unit when it is carrying out an identification procedure; the users at the origin of these changes in status will have to proceed to a new operation upon failure of a first one. This can be the case, for instance, when a subscriber had just removed his handset, or else, when he was dialing the number of his called party. If the case concerns the replacing of the handset by a subscriber, the information will not be processed during the identification operation but will be able to be processed once this identification is carried out since the normal procedure for scanning and processing the subscriber's loop circuits will be started as soon as the identification operation is over.

Figure 4:
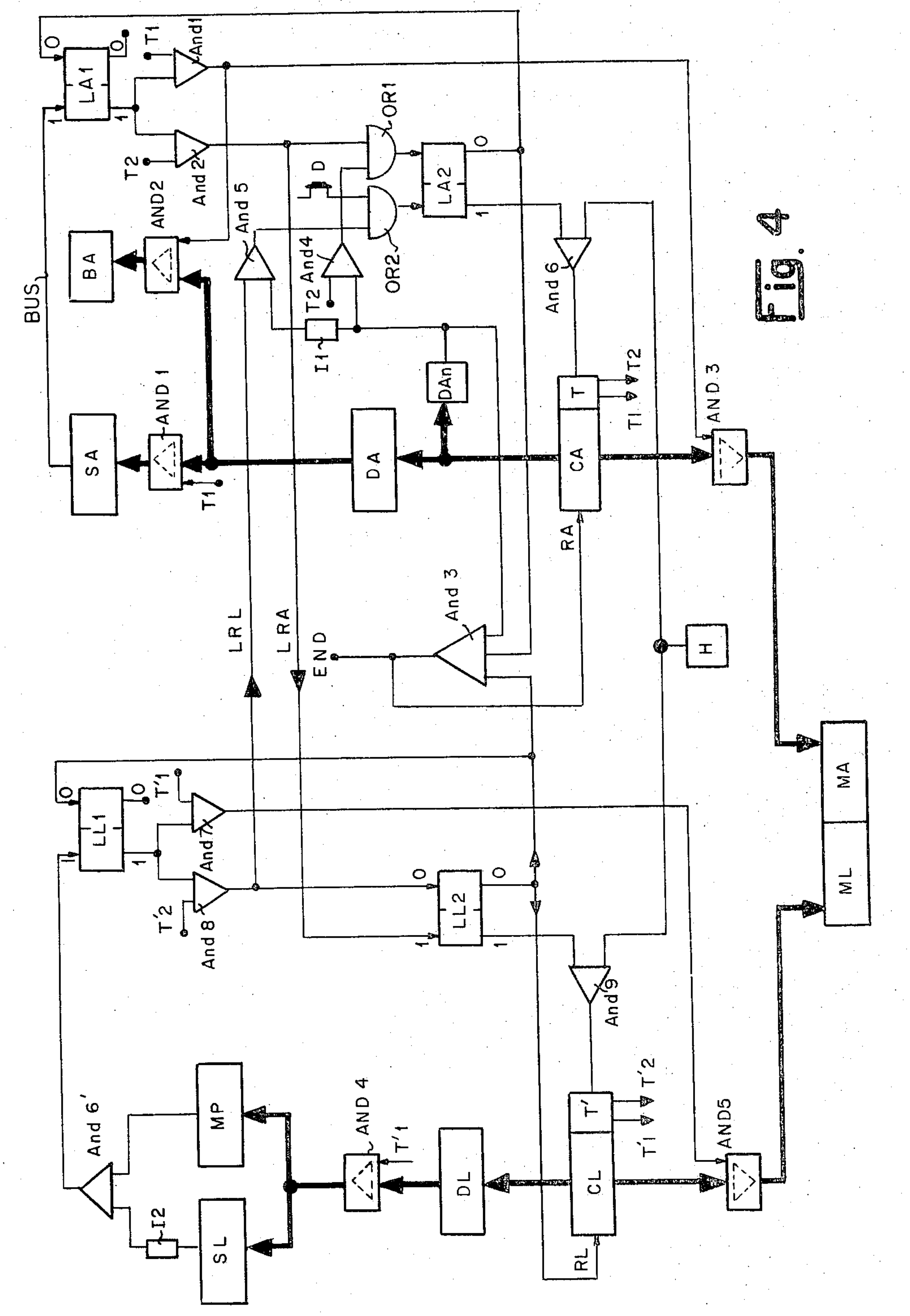
FIG. 4 is a schematic diagram of an assembly of logic circuits for the implementation of the process according to the invention.

With reference to FIG. 4, an assembly of logic circuits will now be described, with which it is possible to implement the operations which have been disclosed with reference to FIG. 3. It is obvious that these circuits are only representative of a particular embodiment of the invention and that the sequential control of the previously-described operations could be made by any other appropriate means.

Figure 5:
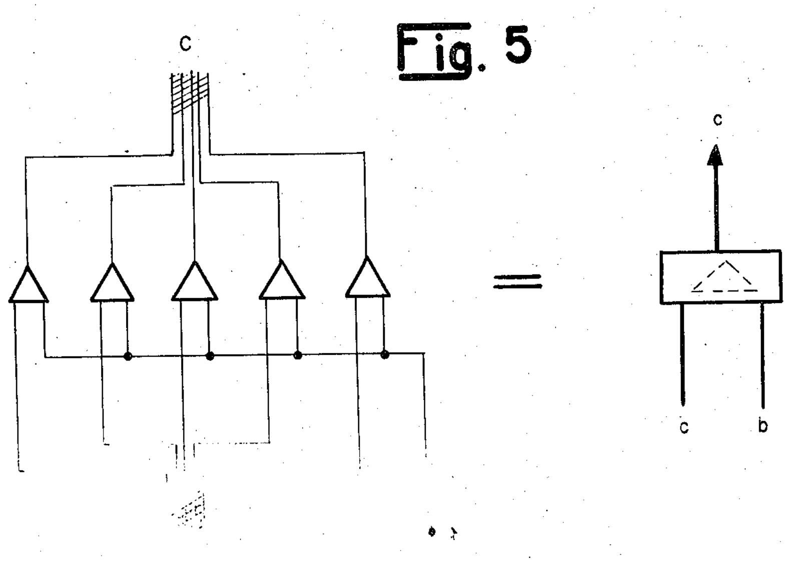
FIG. 5 shows the equivalence of an assembly of AND circuits and their symbolic representation such as used in FIG. 4.

The various logic elements have been shown and referenced in FIG. 4 in the following manner:

- the conventional AND gates are represented by isosceles triangles and are referenced by AND followed with a figure.
- the AND gates fulfilling the AND function on multi-line circuits are represented by rectangles in which a dotted line isosceles triangle is drawn. They are referenced by AND followed with a figure. FIG. 5 shows the symbolic representation of these circuits as well as the multi-line representation of the corresponding circuits.
- the OR gates are represented by an arc of a circle and its chord.
- the latches are represented by rectangles which, on one side, have an input 1 and an output 0 and, on the other side, an output 1 and an output 0. It is clear that when, for instance, input 1 of a latch receives a pulse, the corresponding output 1 becomes fed and remains fed as long as no pulse is received at input 0. When a pulse is received at input 0, output 1 is de-energized and output 0 is fed, and vice-versa. These latches are shown by letter L followed with another alphabetic reference and, then, with a numerical reference.

The assembly of the logic circuits shown in FIG. 4 can be divided into two sub-assemblies, from their function. A first sub-assembly can be considered as being associated with the feeder part whereas the other sub-assembly can be considered as being associated with the extension part.

The first sub-assembly essentially includes a feeder counter CA, a feeder counter decoder DA and a feeder scanner SA.

Figure 6:
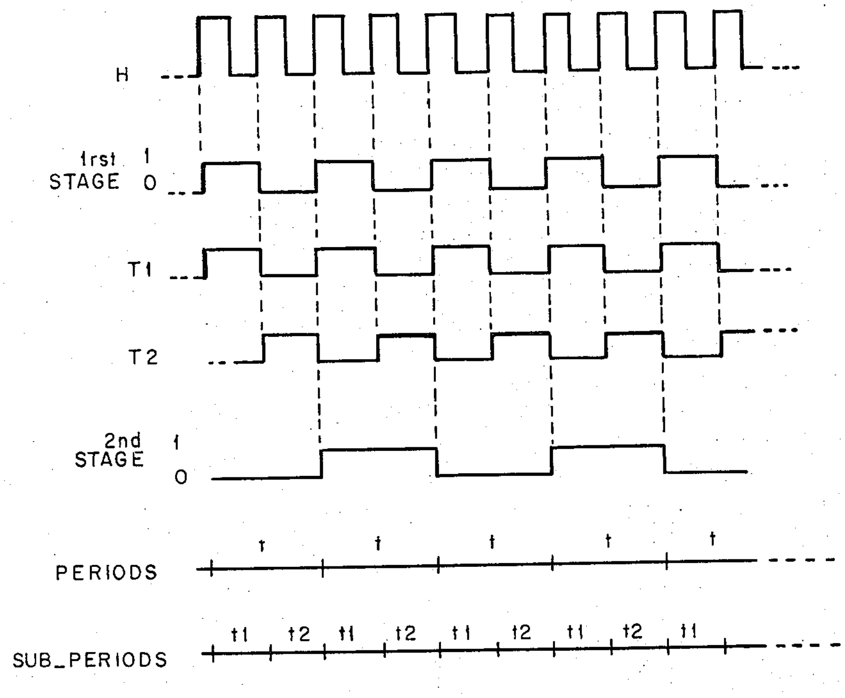
FIG. 6 shows various pulse sequences for a better understanding of the timing operation of the circuits shown in FIG. 4.

The first stage T of feeder counter CA is only used to produce timing pulses, as seen hereinafter. The assembly of the other stages, which will be called the "significant part" of the counter, will be representative of the addresses of the various feeders; the number of these other stages, then, depends only on the total number of the feeders in the switching network. When counter CA is supplied with pulses coming from a clock H, outputs T1 and T2 of the first stage T of said counter are respectively ON in presence of odd and even pulses, respectively, coming from clock H. The second stage of counter CA, i.e., as seen above, the first stage of the "significant part" of the counter, will change its status every other pulse from clock H. This will be better understood with reference to FIG. 6 in which the first line is representative of the pulses produced by clock H, the second line is representative of the status of the first stage T of counter CA, the third line is representative of the signals produced by output T1 of stage T, the fourth line is representative of the signals produced by output T2 of stage T, and the first line is representative of the status of the second stage of counter CA. The sixth and seventh lines of FIG. 6 are respectively representative of time periods *t* lasting between two consecutive increases in the contents of the "significant part" of the counter, and sub-periods *t*1 and *t*2 defined by the signals produced by outputs T1 and T2 of the stage of said counter.

It results therefrom that a feeder address will remain written in counter CA during a time length *t*. The pulses produced by outputs T1 and T2 of stage T will make it possible to divided the time period between two successive addresses in counter CA into two sub-periods *t*1 and *t*2 of the equal length.

The "significant part" of counter CA is connected to an address decoder DA each of the outputs of which corresponds to a well-determined feeder. This means that, for a deter-mined address contained in counter CA, one output and one only of decoder DA must be fed.

Each of the outputs of address decoder DA is connected, through intermediary of an AND gate and second input of which is driven by timing circuit T1, to the scanning circuit of the corresponding feeder. The assembly of the AND gates associated with the various outputs of decoder DA, has been symbolically shown at AND 1 whereas the rectangle SA is representative, as a whole, of the various scanning circuits of the feeders.

Each of the outputs of address decoder DA is also connected, through intermediary of an AND gate, to the control circuit of the corresponding feeder. The assembly of the AND gates associated with these various outputs, has been shown, as a whole, at AND 2 whereas the rectangle BA is representative, as a whole, of all of the control circuits on the feeders. The second input of AND gate 2 is driven by the output of an AND gate, AND 1, and which will be studied further on.

All the output circuits of the feeder scanners are connected to a bus line BUS which is connected to input 1 of a latch LA1. Output 0 of said latch is not used. The output 1 is connected to a first AND gate, AND 1, on the one hand, and to a second AND gate, AND 2, on the other hand. The second input of AND gate AND 1 is driven by timing circuit T1 whereas the second input of AND gate, AND 2 is driven by timing circuit T2.

The output of gate AND 1 is connected to AND gates which have been shown as a whole at AND 3. The second inputs of gates AND 3 respectively receive the signals coming from the various stages of the "significant part" of feeder counter CA. The outputs of gates AND 3 are directed into a storing unit which, in order to make the description clearer, will be called feeder memory, and which is represented by MA.

The output of gate AND 2 is connected to a link LRA with the second logic sub-assembly the description of which is given further on, on the one hand, and to a first input of an OR gate OR1, on the other hand. The output of gate OR 1 drives input 0 of latch LA2.

Output 0 of latch LA2 is connected to input 0 of latch LA1 on the one hand, and to one of the three inputs of an AND gate AND 3 on the other hand. Output of gate AND 3 is indicative, when it is fed, that the finding out procedure is over, as seen further on, when explaining the operation of the logic circuits. This output is also utilized to reset feeder counter CA by operating upon one particular input RA of said counter.

The "significant part" of feeder counter CA is also connected to decoder DAn intended to recognize the address of the last feeder in counter CA. This means that, when the address of the last feeder is contained in counter CA, circuit DAn will produce a signal on its output circuit. Said output circuit is connected to a second input of the already-mentioned gate AND 3, on the one hand, and to a first input of an AND gate AND 4, the second input of which is driven by timing circuit T2, on the other hand. The output of gate AND 4 is connected to a second input of the already-mentioned Gate OR 1. The output of decoder DAn is also connected, through intermediary of inverter I1, to a first input of an AND gate And 5 the second input of which is driven by a link LRL coming from the second sub-assembly which will be disclosed further on. The output of gate And 5 is connected to the first input of an OR gate referenced by OR 2 the output of which is connected to input 1 of latch LA2, gate OR 2 includes a second input which is connected to a start switch which is very schematically shown at D in the figure.

Output 1 of latch LA2 drives the first input of an AND gate And 6 the second input of which receives, in a permanent manner, the timing pulses coming from clock H. The output of gate And 6 controls the stepping of feeder counter CA.

The logic sub-assembly will now be described which can be considered as being associated with the telephone lines corresponding to the extension lines which, as seen above, have been simply referred to as extensions.

This sub-assembly is essentially made of a line counter CL, an address decoder DL, line scanning circuits SL and a previous status register MP.

Counter CL is of the same type as the one disclosed under reference CA and its operation is identical. This means that, when said counter receives the pulses coming from clock H, output T'1 and T'2 of the first stage T' of counter CL, respectively produce signals defining two equal sub-periods within the period of time covering two successive changes in status of the remaining part of counter CL. This remaining part, which will also be called the "significant part" is representative of the line addresses.

The "significant part" of line counter CL is connected to line decoder DL each of the outputs of which corresponds to a particular line. Each of the output of decoder DL is connected, through intermediary of an AND gate the second input of which is driven by timing circuit T'1, to the corresponding line scanning circuit, on the one hand, and to the corresponding particular position of the previous status register MP, on the other hand. The AND gates associated with the different outputs of decoder DL have been represented in figure as a whole, under reference AND 4.

All the outputs of line scanners SL are connected to a same line which, through intermediary of inverter 12, drives the first input of AND gate And 6'. It results therefrom that the output of gate And 6' will be fed only when the line which is being scanned is detected to be idle whereas its previous status was "busy".

The output of gate And 6' drives input 1 of a latch LL1. Output 0 of said latch is not utilized. Output 1 of latch LL1 is connected, on the one hand, to the first input of a first AND gate And 7 the second input of which is driven by timing circuit T'1, and, on the other hand, to the first input of a second AND gate And 8 the second input of which is driven by timing circuit T'2.

The output of gate And 7 is connected to the first respective inputs of a series of AND gates which have been represented as a whole under reference AND 5. The second respective inputs of said AND gates receive the different signals coming respectively from the significant stages of line counter CL. The outputs of gates AND 5 are connected to a storing unit which will be called "line memory" and which is schematically shown in the figure under reference ML.

The output of gate And 8 is connected to link LRL already mentioned with respect to the description of the first subassembly, on the one hand, and to input 0 of a latch LL2, on the other hand. Input 1 of said latch LL2 is driven by the above mentioned link LRA.

Output 0 of latch LL2 is connected to input 0 of latch LL1 as well as to the third input of the above-mentioned gate And 3, as well as to reset input RL of line counter CL. Output 1 of latch LL2 is connected to gate And 9 the second input of which receives the pulses coming from clock H. The output of gate And 9 controls the stepping of counter CL.

Still with reference to FIG. 4, the operation of the just described logic circuits will now be disclosed. In order to make the description clearer, a complete procedure for the identification of the connections will be set forth.

At rest condition, all the latches LA1, LA2, LL1, LL2 assume status 0. All the stages of either of counters CA and CL assume status 1 so that the first stepping pulse received by a counter causes it to step to an "all O" status. Since triggers LA2 and LL2 assume status 0, gates And 6 and And 9 are OFF, and therefore the two counters CA and CL are not fed by the pulses coming from clock H. Consequently, timing circuits T1, T2, T'1 and T'2 produce no signal.

It will now be supposed that an order coming from a control unit has just been given to start a connection identifying procedure. Before any action of the logic circuits, this order starts a scanning procedure of each of the lines corresponding to the extensions and the results of said scanning operation are written in memory MP which, then, contains the initial status of each of the lines corresponding to the extensions. This scanning operation necessitates no description since it is quite conventional and similar to the sequential scanning procedure which takes place during the normal operation of the switching network.

Then, the finding out order causes the momentaneous closure of the start switch symbolically shown at D in FIG. 4, which causes a pulse to smear at the output of gate OR 2 and latch LA2 to pass from status 0 to status 1.

Since output 1 of latch LA2 is now fed, gate And 6 grows conducting and the pulses coming from clock H are transmitted to counter CA.

Since this counter contained only 1's, the first pulse coming from H will cause said counter to step to a "All 0" status. At this moment, circuit T1 will be fed during instant t1 since the first stage contains a 0. At this moment, the address contained in counter CA, i.e., "all 0" is the address representative of the first feeder. This address is decoded by DA and, at instant *t*1, the corresponding feeder, namely Ao, is scanned so that, in the same time, the status of feeder A1 appears on the output line BUS of scanning circuits SA.

It will be supposed, first, that this first feeder is idle, which means that there is no signal on line BUS. Since input 1 of latch LA1 is still not fed, said latch, then, remains in status 0.

As soon as a second pulse appears coming from clock H, timing circuit T1 is no more fed, but circuit T2 is, in its turn. Of course, the significant contents of counter CA does not change due to the fact that its first stage only has its status changed. During instant *t*2, which corresponds to the time length of the signal appearing on timing circuit T2, no significant change occurs; indeed, gate And 2 is OFF since, as seen above, output 1 of latch LA1 is not fed; besides, gate And 4 is not ON, either since decoding circuit DAn has not detected the presence of the address of the last feeder in counter CA. Since none of the outputs of gates And 2 and And 4 is fed, gate OR 1 is OFF and it results therefrom that input 0 of latch LA2 is not energized. This latch, then, remains in status 1 in which it was before, gate And 6 then, remains ON and the following clock pulse is therefore transmitted to counter CA. Since the first stage of this counter is in status 1, this stage will step to status 0 while the second stage will step to status 1, thus writing a new feeder address in the significant part of the counter. The 0 contained in the first stage will cause timing circuit T1 to be fed, as seen previously.

In a way similar to that which has just been described, feeder A1, the address of which is now contained in counter CA, will be scanned at instant *t*1, and output line BUS of the scanners will be fed or not according as said feeder is busy or not. As long as a feeder has not been detected to be busy, the procedure continues in like manner, as seen previously.

It will be now be supposed that counter has reached an address corresponding to a busy feeder, namely Ai. At instant *t*1, address A1 is decoded in DA and the scanner detects that said feeder is busy, at instant *t*1. This comes to a signal which appears on line BUS, which signal causes latch LA1 to pass from status 0 to status 1.

During this very instant *t*1, gate And 1 will be O1 and the signal present at the output of said AND gate will allow the address of feeder Ai contained in counter CA to be transmitted, through gate AND 3, to memory MA wherein said address will be stored. In addition, the signal present at the output of this very gate And 1 will also allow control circuit BAi of feeder Ai to be addressed, and said feeder to be disconnected.

At instant *t*2, gate And 2 will be ON and the signal present at the output of said circuit will cause latch LA2 to pass from status 1 to status 0, through intermediary of gate OR1. Since output 1 of latch LA2 is no more fed, the pulses coming from clock H can no longer go through gate And 6 and, therefore, reach counter CA which is stopped to the address of the feeder which has just been scanned, the first stage of said counter containing a 1.

The signal present at the output of gate And 2 during instant *t*2 has also for an effect to cause latch LL2 to pass from status 0 to status 1, through intermediary of line LRA.

Since output 1 of latch LL2 is now fed, gate And 8 then, is ON and the first pulse coming from clock H then, is transmitted to counter CL.

Since this counter contained 1's, only, it steps to an "all 0" value. Consequently, timing circuit T'1 is fed and line Lo the address of which, i.e., "all 0", is contained in the significant part of counter CL, is decoded by decoder DL; still during sub-period t'1, line Lo is scanned. While line Lo is being scanned, the cell of memory MP corresponding to the address of line Lo is read and the results of the two scanning operations appear on the respective output lines of scanner SL and memory MP. Should the condition of line Lo be identical with the in memory MP, gate And 6' will be OFF due to the presence of inverter 12. Consequently, the output of gate And 6' will not be fed and latch LL1 will remain in its status 0.

Since output 1 of latch LL1 is not fed, gate And 7 will be OFF during instant *t*'1. During instant *t*'2, it will happen nothing particular; indeed, gate And 8 will be OFF since output 1 of latch LL1 is not fed, and latch LL2 will, therefore, remain in its status 1 wherein it was previously. A new pulse will be transmitted through gate And 9 from clock H and the address contained in counter CL will be increased by one unit.

As long as the status of the scanned line and the previous status of the same which is read out from memory MP, are not identical, gate And 8' will be OFF and latch LL1 will remain in its status 0. Everything will happen as seen just now.

It will now be supposed that counter CL has reached the address of a particular line, namely line Lj, the status of which, which has been stored in memory MP, was the busy status, whereas the status which has just been detected through a scanning operation, is the idle status.

At instant *t*'1, line Lj is scanned by the corresponding scanning circuit SLj, and the previous status of this very line is written in memory MP. The output of scanning circuits SL is not fed, but, since inverter I2 is present, the corresponding input of gate And 6' is fed. Since the previous status of line Lj was "busy", then, the reading circuit of memory MP will be fed and the corresponding intput of gate And 6', then, will be energized. Due to this fact, gate And 6' grows conducting and the signal which appears at the output of said gate causes latch LL1 to pass from status 0 to status 1.

Still during instant *t*'1, gate And 7 grows conducting, which causes the address of line Lj contained in counter CL to be transmitted, through intermediary of gate AND 5, to the storing unit, or line memory, ML in front of the feeder address previously stored in the corresponding call of memory MA.

At instant *t*'2, gate And 8 grows conducting, which causes latch LL2 to pass from status 1 to status 0. At this moment, output 1 of said latch is no more fed and the pulses coming from the clock then, cannot reach any longer counter CL, which is stopped. Output 0 of latch LL2 is now fed which causes input RL of counter CL to be energized and the contents of said counter to be stepped back to its initial position, namely, "all O", on the one hand, and input 0 of latch LL1 to be fed, thus causing said latch to pass from status 1 to status 0, on the other hand.

During this very instant *t*'2, the signal appearing at the output of gate And 8 is transmitted through link LRL and, since counter CA does not still contain at this very moment the address of the last feeder, gate And 5 grows conducting.

The signal appearing at the output of gate And 5 is transmitted, through intermediary of gate OR 2, to input 1 of latch LA2 which, thus, passes from status 0, wherein it was previously, to status 1.

Output 1 of latch LA2 is fed anew and gate And 6 then grows conducting anew and the first clock pulse which appears, starts counter CA, anew. Since counter CA had stopped at the end of instand *t*2, as soon as the first clock pulse appears, its significant contents will be increased by one unity, and then it will contain the address of feeder A(*i*+1) which immediately follows the one of feeder A*i* wherein it stopped previously. The procedure continues in a manner similar to that described above until output line BUS of scanner SA detects anew that a feeder is in the busy status. As soon as such a feeder is detected, counter CA is stopped and counter CL is started anew, and the procedure goes on in a manner similar to that described previously.

The case where counter CA reaches the count corresponding to the address of the last feeder, namely An, will now bestudied. As seen for each of the previous cases, this feeder can be either idle or busy; there will be examined successively how the procedure ends in these two respective cases.

First, it will be supposed that the last feeder, namely An, is idle. For a better understanding, it will be reminded that, at this moment, latches LL1, LL2 and LA1 are in status 0 whereas latch LA2 is in status 1.

At instant *t*1, the scanner will detect the idle status of feeder An and, consequently, input 1 of latch LA1 will not be fed and this latch will remain in status 0 where is was previously. At instant *t*2, gate And 4 will grow conducting since decoder DA has detected the presence of the address of feeder An in counter CA. The signal which appears at the output of gate And 4 will be transmitted to input 0 of latch LA2, through intermediary of gate OR 1.

Since output 1 of latch LA2 is no more fed, gate And 6 is no more ON and the pulses from clock H do not reach any longer counter CA, which is stopped.

Because output 0 of latch LL2, output 0 of latch LA2 and the output of decoder DAn are, all three, fed, gate And 3 grows conducting and an end-of-finding out signal is produced at its output. This very signal has for an effect that input RA of counter CA is energized, which causes said counter to be reset to its initial position, i.e., "all 1". The connection identifying procedure, then, is over. Memories MA and ML then, contain the respective addresses of the feeders and the lines which correspond thereto. The control unit of the network then, can reestablish the connections existing between said feeders and lines, two by two, by controlling the feeding of the corresponding control circuits DA as well as the feeding of the control circuits of the crosspoint switches involved in these connections. The fact of knowing the addresses of a feeder and the line which corresponds thereto, makes it possible to know also the addresses of the crosspoint switches since, as seen above, there is only one possible path between a feeder and a given line.

The case where the last considered feeder, namely An, is busy will be discussed now.

At instant *t*1, feeder An is scanned and, since it has been supposed that it was busy, line BUS then, produces a signal at input 1 of latch LA1, which causes said latch to pass from status 0 to status 1. During this very instant *t*1, gate And 1 grows conducting and the signal produced by this circuit will condition gate AND 2 corresponding to feeder An, on the one hand, and gate AND 3, on the other hand. Therefore, control circuit BAn of feeder An will be de-energized and this feeder, then, will be disconnected. As to gate AND 3, it makes it possible to transmit the address of feeder An contained in counter CA to memory MA.

At instant *t*2, gate And 2 grows conducting due to the presence of a signal at output 1 of latch LA1 and this signal, through intermediary of gate OR1, causes latch LA2 to pass from status 1, where it was previously, to status 0, which, in turn causes latch LA1 to pass from status 1 to status 0.

Since no signal is produced any longer at output 1 of latch LA2, this blocks gate And 6 which, then, does not produce any more pulses to counter CA; therefore, the latter is stopped to the address of feeder An.

At the same instant *t*2, the output signal from gate And 2 is transmitted through line LRA to the input 1 of latch LL2. Output 1 of said latch is now ON and timing pulses can reach counter CL. As already described before, as soon as an extension line is detected to have passed from the ON status to the OFF status, i.e. that gate And 6' is ON, latch LL1 passes from status 0 to status 1. At instant *t'*1, the address of this extension is transferred to memory through gate AND 5; at instant *t'*2 latch LL2 is reset to status 0. Counter CL is then reset to its initial state, i.e. all 1's.

At this moment, output 0 of latch LA2, output 0 of latch LL2 and the output of decoder DAn being all ON, gate And 3 is enabled.

As seen previously, the signal produced by gate And 3 is indicative that the finding out procedure is over, and, besides, controls the resetting of counter CA to its initial condition. In order to make the description clearer, it has been supposed that the initial condition of counter CA, i.e., the condition wherein each of the stages contains 1's, is not the same as the condition corresponding to the address of the last feeder.

Therefore, the finding out procedure is over and, as seen in the previous case, memories MA and ML then, contain the addresses of the feeders and their corresponding lines. It just remains to re-establish the connections from the addresses contained in these memories, as seen previously.

Of course, numerous alternatives could be conceived either within the scope of the identification procedure itself, or within the scope of the above-described logic circuits. For instance, the re-establishment of the connections the identification of which has been made, can be operated during the finding out operation; for instance, each time a feeder and its corresponding line have been identified, the path corresponding to these two elements will be able to be re-established immediately after their identification instead of proceeding to this re-establishment when the finding out operation is completely terminated, as seen in the previous examples. Such a variation implies only slight modifications in the logic circuits which have just been disclosed, but these modifications are within the field of the man skilled in the art and must be considered as being included in this invention.

It is obvious that the same process applies to any other switching network whatever be the nature of the input and output lines and whatever be the nature of the crosspoint switches, therein.

It is clear that the preceding description has only been given as an unrestrictive example and that numerous alternatives may be considered without departing from the spirit and scope of the invention.

What is claimed is:

1. A process for identifying connections established in a switching network between lines of a first series and lines of a second series, said network being of the type wherein, a plurality of cascade related switching matrix stages connected by links are provided for connecting, at will, lines of said first series to lines of said second series, a given first series line and a given second series line can be connected to each other only through a single determined path, a current source is associated with each second series line, which is intended to feed a possible connection path between a first series line and a second series line, and scanning means are provided for scanning the ON or OFF status of the first series and second series lines, said process being characterized by the following steps:

a. all of said first series lines are sequentially scanned and their respective status stored, b. said second series lines are sequentially scanned until one is found to be in the ON status;

c. as soon as a second series line is found to be in the ON status, the scanning of the second series lines is stopped, the identity of said second series line found to be ON is stored and, the current source which is associated therewith is disconnected, d. the first series lines are sequentially scanned, starting with the first one and, for each of them, the current status is compared with the status of the same line stored during step a., e. thus, as soon as a first series line is detected to have changed from the ON status to the OFF status, the scanning of the first series lines is stopped and the identity of the detected first series line is stored as corresponding to the second series line detected to be ON during step *c*., f. the sequential scanning operation of the second series lines is resumed from the line which immediately follows the one identified during step c. and, each time a second series line is found to be ON, steps *c*., *d*., and *e*. are repeated until the last second series line in the series is reached, g. should the last second series line be in the ON status, steps *c*., *d*., and *e*., are repeated, then the procedure is stopped and, should the last second series line be in the OFF status, the procedure is immediately stopped.

2. The process in accordance with claim 1, wherein said first series lines are input lines, said second series lines are output lines, and said single determined path is through the intermediary of determined crosspoint switches.

3. A process according to claim 2, characterized in that said switching network is a telephone switching network, said input lines are the conductors connecting the subscriber's line transformer winding to the network, and said output lines are the lines connecting the network to the middle junctors in the network.

4. A process according to claim 3, characterized in that said current sources are middle junctor feeders.

5. Apparatus for identifying connections established in a switching network between lines of a first series and lines of a second series, comprising an address counter for said second series of lines, the contents of which can be stepped under the action of timing pulses, a second series line scanner, a decoder for addressing a second series line the address of which corresponds to the contents of said second series address counter for scanning said line and disconnecting a current source associated therewith, a first detector supplying a first detection signal when one scanned second series line is detected in the ON status, a busy second series line address memory, a first series line address counter the contents of which can be stepped under the action of timing pulses, a first series line scanner, a previous status first series line register, a decoder for addressing, on the one hand, the first series line the address of which corresponds to the contents of said first series line address counter, with a view to scanning said line and, on the other hand, said previous status line register with a view to reading out the previous status of said first series line, means for comparing the result of the scanning of a first series line with the previous status of the same first series line, and for producing a second detection signal when said same line is in the OFF status whereas its previous status was ON, a changed status first series line address memory, a timing pulse source, first means responsive to said first detection signal which, when said signal is not present, allows the timing pulses to be transmitted to said second series line address counter and, when said signal is present, control the stopping of the transmission of said timing pulses to said second series line address counter, the disconnection of the current source associated with the second series line, the address of which corresponds to the contents of said second series line address counter, the transfer of the address corresponding to the contents of said second series line address counter to a determined cell of said busy second series line address memory and, finally, the sending of the timing pulses to said second series line address counter.

second means responsive to said second detection signal which, when such a signal is absent, allows timing pulses to be transmitted to said first series line address counter and, when said signal is present, control the stopping of the transmission of said timing pulses to said first series line address counter, the transfer of the address corresponding to the contents of said first series line address counter to a determined cell of said changed status first series line address memory corresponding to said determined cell of said busy first series line address memory, the resetting of said first series line address counter to its initial condition, and finally, the sending of the timing pulses to said first series line address counter, means for detecting the presence of the address corresponding to the last of said first series lines in said first series line address counter and then supplying a third detection signal, and means simultaneously responsive to the absence of said first and second detection signals and to the presence of said third detection signal to produce a signal for terminating the procedure and resetting of said first series line address counter to its initial condition.

6. Apparatus in accordance with claim 5, wherein said first series lines are input lines, said second series lines are output lines, wherein said switching network includes a plurality of cascade related switching matrix stages connected by links for connecting, at will, lines of said first series to lines of said second series, a given first series line and a given second series line can be connected to each other only through a single determined path, said current source is associated with each second series line which is intended to feed a possible connection path between a first series line and a second series line.

7. Apparatus in accordance with claim 6 wherein said switching network is a telephone switching network, said input lines are the conductors connecting the subscriber's line transformer winding to the network, and said output lines are the lines connecting the network to the middle junctors in the network.

8. Apparatus in accordance with claim 7 wherein said current sources are middle junctor feeders.

* * * * *